United States Patent Office 3,205,218
Patented Sept. 7, 1965

3,205,218
AZO, ANTHRAQUINONE, AND PHTHALO-
CYANINE DYESTUFFS
Alexander Weir Arbuckle, Peter Frederick Clark, and
Raymond Price, Manchester, England, assignors to
Imperial Chemical Industries Limited, London, Eng-
land, a corporation of Great Britain
No Drawing. Filed Nov. 20, 1961, Ser. No. 153,731
Claims priority, application Great Britain, Nov. 24, 1960,
40,463/60
1 Claim. (Cl. 260—146)

This invention relates to new dyestuffs and more par-
ticularly it relates to processes for the manufacture of new
dyestuffs which are valuable for colouring textile materials.

According to the invention there is provided a process
for the manufacture of new dyestuffs which comprises re-
acting a 1:3:5-triazine or pyrimidine carrying at least
two reactive halogen atoms and/or labile groups, as here-
inafter defined, with a dyestuff compound which contains
at least one group of the formula: —AH wherein A re-
presents —O—, —S— or

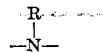

and R represents a hydrogen atom or a cycloalkyl radical
or substituted or unsubstituted alkyl radical, and with a
compound of the formula:

wherein X represents a hydrogen atom or a substituted
or unsubstituted hydrocarbon radical or a COR' or
—COOR' group and Y and Z independently represent a
—CN, —NO₂, —CF₃, —CHO, —COR', —COOR',
—COCOOR', CONH₂, —CSR',

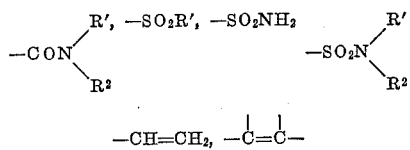

or —CH=C(COOR')₂ group, wherein R' represents a
substituted or unsubstituted hydrocarbon radical and R²
represents a hydrogen atom or a substituted or unsubsti-
tuted hydrocarbon radical.

The products so obtained are "reactive" dyestuffs having
a surprisingly high reactivity compared with previously
known "reactive" dyestuffs having similar constitutions.

As examples of alkyl radicals represented by R there
may be mentioned lower alkyl radicals such as methyl,
ethyl, propyl and butyl radicals which may contain sub-
stituents such as hydroxy, ethoxy and methoxy groups,
and as an example of a cycloalkyl radical represented by
R there may be mentioned the cyclohexyl radical.

As examples of the substituted or unsubstituted hy-
drocarbon radicals represented by R', R² and X there
may be mentioned alkyl radicals in particular lower
alkyl radicals such as methyl, ethyl, propyl and butyl
radicals, substituted alkyl radicals in particular sub-
stituted lower alkyl radicals for example alkoxy lower
alkyl radicals such as methoxyethyl and ethoxyethyl
radicals and aryl lower alkyl radicals such as benzyl
and β-phenylethyl radicals, cycloalkyl radicals such
as the cyclohexyl radical, aryl radicals in particular mono-
cyclic aryl radicals such as phenyl and tolyl radicals and
dicyclic aryl radicals such as the naphthyl radical which
aryl radicals may contain substituents such as halogen
atoms or nitro, alkoxy or carboxylic ester groups.

The term "lower alkyl radical" is used to denote an
alkyl radical containing from 1 to 6 carbon atoms.

In carrying out the process of the invention it is pre-
ferred to react the compound of Formula 1 with the said
1:3:5-triazine or pyrimidine and subsequently to react
the resulting compound with the dyestuff compound con-
taining at least one —AH group.

The compounds of Formula 1 are preferably used in the
form of their derivatives with alkali metals in particular
in the form of their derivatives with potassium and above
all with sodium.

The process of the invention may be conveniently
brought about by adding a solution of the said 1:3:5-
triazine or pyrimidine in water or in an organic liquid
such as ethyl alcohol, dioxan, diethylcarbonate or diethyl-
ether, to a solution or suspension of the sodium or potas-
sium derivative of the compound of Formula 1 in water
or in an organic liquid, stirring the resulting mixture,
preferably at a temperature between 10° and 100° C.,
cooling the mixture, adding a solution of the said dyestuff
compound in water or in a water-soluble organic liquid,
stirring the mixture, preferably at a temperature between
20° and 100° C., whilst maintaining the pH of the mixture
between 6.0 and 8.0 by the addition of an alkali such as
sodium carbonate, adding water and/or sodium chloride
to precipitate the resulting dyestuff and isolating the dye-
stuff.

As examples of compounds of Formula 1 which may be
used in the process of the invention, preferably in the
form of their sodium or potassium derivatives, there may
be mentioned triethoxycarbonylmethane, acetylacetone, 3-
acetylpentane-2:4-dione, ethyl cyanoacetate, methylcyano-
acetate, methyl acetoacetate, ethyl acetoacetate, ethyl benz-
oylacetate, ethyl oxaloacetate, dimethylmalonate, diethyl-
malonate, di-n-propylmalonate, malonodinitrile, cyano-
acetamide, ethyl - α -nitroacetate, ω - cyanoacetophenone,
acetoacetamide, acetoacet-N-methylamide, acetoacet-N:N-
diethylamide, benzoylacetone, propionylacetone, ethyl
formylacetate, malonodialdehyde, diethyl ethylmalonate,
diethylphenylmalonate, phenyl α-cyanomethylsulphone,
acetoacetanilide, acetoacet-o-toluidide, acetoacet-m-anisi-
dide, phenylsulphonylacetic esters and phenylsulphonyl-
acetamide. Of these, the preferred compounds are acetyl-
acetone, lower alkyl esters of acetylacetic acid, lower alkyl
esters of cyanacetic acid, lower alkyl esters of malonic
acid and acetoacetarylides.

As examples of halogen atoms which may be present
in the 1:3:5-triazines or pyrimidines used in the process
of the invention there may be mentioned bromine and
above all chlorine atoms.

As examples of labile groups which may be present
in the 1:3:5-triazines or pyrimidines used in the process
of the invention there may be mentioned sulphonic acid, thiocyano, sulphonated aryloxy and sulphonated arylthio groups; of the formula:

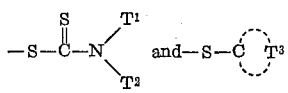

wherein $T^1$ and $T^2$ each represent a substituted or unsubstituted alkyl, cycloalkyl, aryl, aralkyl or heterocyclic radical and may be the same or different or $T^1$ and $T^2$ together form with the nitrogen atom N a 5- or 6-membered heterocyclic ring, and $T^3$ represents the group of non-metallic atoms required to form a 5- or 6-membered heterocyclic ring which may carry substituents or form part of a condensed ring system.

As examples of the sulphonated aryloxy and sulphonated arylthio groups there may be mentioned sulphophenoxy, disulphophenoxy, chlorosulphophenoxy, sulphonaphthoxy, disulphonaphthoxy and sulphophenylthio groups.

As examples of the substituted or unsubstituted radicals represented by $T^1$ and $T^2$ there may be mentioned alkyl radicals for example lower alkyl radicals such as methyl, ethyl, propyl, butyl and amyl radicals, substituted alkyl radicals for example substituted lower alkyl radicals such as hydroxy lower alkyl radicals for example hydroxyethyl, hydroxypropyl and dihydroxypropyl radicals, alkoxy lower alkyl radicals such as methoxyethyl and ethoxyethyl radicals, aryl substituted lower alkyl radicals such as benzyl and β-phenylethyl radicals, cycloalkyl radicals such as cyclohexyl radical, aryl radicals for example monocyclic aryl radicals such as phenyl and tolyl radicals, and dicyclic aryl radicals such as the naphthyl radical which aryl radicals may contain substituents such as chlorine or bromine atoms or nitro, alkoxy, sulphonic acid or carboxylic acid groups.

As examples of the heterocyclic radicals represented by $T^1$ and $T^2$ there may be mentioned pyridyl and morpholino.

As examples of the 5- or 6-membered heterocyclic rings which are formed by joining $T^1$ and $T^2$ together with the nitrogen atom N there may be mentioned piperidyl and morpholino.

As examples of the 5- or 6-membered heterocyclic rings formed by the

group there may be mentioned furane, oxazole, pyrazole, selenazole, thiophene, pyran, pyridine, pridazine and especially thiazole rings. The 5- or 6-membered heterocyclic rings may form part of a condensed ring system such as a quinoline, benzthiazole or naphthothiazole ring system. As examples of substituents which may be present in the heterocyclic rings there may be mentioned alkyl such as methyl and halogen such as chlorine. It is preferred however that the sulphur atom is attached to a carbon atom of the said 5- or 6-membered heterocyclic ring which is adjacent to an oxygen, sulphur, nitrogen or selenium atom present in the said heterocyclic ring.

As examples of 1:3:5-triazines or pyrimidines containing at least 2 reactive halogen atoms and/or labile groups which can be used in the process of the invention there may be mentioned cyanuric chloride,
cyanuric bromide,
2:4-dichloro-1:3:5-triazine,
2-methoxy-4:6-dichloro-1:3:5-triazine,
2-ethoxy-4:6-dichloro-1:3:5-triazine,
2-methyl-4:6-dibromo-1:3:5-triazine,
2-phenyl-4:6-dichloro-1:3:5-triazine,
2-methylamino-4:6-dichloro-1:3:5-triazine,
2-ethylamino-4:6-dichloro-1:3:5-triazine,
1:4-bis(4':6'-dichloro-1':3':5'-triazin-2'-ylamino)benzene,
2-phenoxy-4:6-dichloro-1:3:5-triazine,
2-(sulphophenoxy)-4:6-dichloro-1:3:5-triazine,
2-amino-4:6-dichloro-1:3:5-triazine,
2-anilino-4:6-dichloro-1:3:5-triazine,
2-mercapto-4:6-dichloro-1:3:5-triazine,
2-methylmercapto-4:6-dichloro-1:3:5-triazine,
2-phenylmercapto-4:6-dibromo-1:3:5-triazine,
2:4:6-trichloropyrimidine,
2:4:6-tribromopyrimidine,
2:4:6-trichloro-5-methylpyrimidine,
2:4:5:6-tetrachloropyrimidine,
2:4:5:6-tetrabromopyrimidine,
2:4:6-trichloro-5-nitropyrimidine,
2:4-dichloro-5-nitro-6-methylpyrimidine,
2:4:6-trichloro-5-cyanopyrimidine,
2:4:6-tribromo-5-cyanopyrimidine,
5-cyano-2-methyl-4:6-dichloropyrimidine,
2-methyl-4:6-dichloro-5-nitropyrimidine,
2-chloro-4-(diethylthiocarbamoylthio)-6-methoxy-1:3:5-triazine,
2-chloro-4-(diethylthiocarbamoylthio)-6-phenyl-1:3:5-triazine,
2-(benzthiaz-2'-ylthio)-4-chloro-6-methoxytriazine,
2-(benzthiaz-2'-ylthio)-4-chloro-6-phenyl-1:3:5-triazine and
2-(benzthiaz-2'-ylthio)-4-chloro-6-diethylamino-1:3:5-triazine.

(The last five compounds may be obtained by condensing the appropriate 2:4-dichloro-6-substituted-1:3:5-triazine with sodium diethyldithiocarbamate or with 2-mercaptobenzthiazole.)

Each of the —AH groups, as hereinbefore defined, is attached to a carbon atom present in the dyestuff compound used in the process of the invention. The said carbon atom may form part of an aryl residue present in the dyestuff compound or may form part of an alkyl chain which is directly attached to an aryl residue present in the dyestuff compound or is attached to the aryl residue through a bridging atom or group. As examples of such bridging atoms or groups there may be mentioned

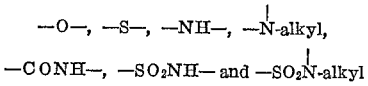

The said dyestuff compound may be a member of any known dyestuff series but preferably it is a dyestuff compound of the azo, which may be monoazo or polyazo, nitro, anthraquinone or phthalocyanine series. The dyestuff compound preferably contains a water-solubilising group such as a carboxylic acid, alkylsulphone, sulphonamide and above all a sulphonic acid group. If desired the dyestuff compound may also contain coordinately bound metal such as coordinately bound copper, chromium or cobalt.

It is preferred that each of the —AH groups present in the dyestuff compounds used in the process of the invention represents a

group, wherein R has the meaning stated above.

As examples of dyestuff compounds containing at least one —NHR group, as hereinbefore defined, which may be used in the process of the invention there may be mentioned the dyestuff compounds of the following classes without, however, limiting the classes to those specifically described.

(1) Monoazo compounds of the formula:

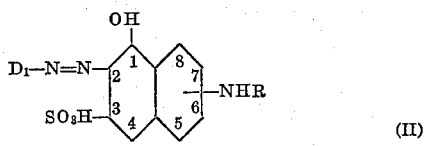

(II)

wherein $D_1$ represents a mono- or dicyclic aryl radical which is free from azo groups and NHR groups, the —NHR group is preferably attached to the 6-, 7- or 8-position of the naphthalene nucleus, and which may contain a sulphonic acid group in the 5- or 6-position of the naphthalene nucleus.

$D_1$ may represent a radical of the naphthalene or benzene series which is free from azo substituents, for example a stilbene, diphenyl, benzthiazolylphenyl or diphenylamine radical. Also in this class are to be considered the related dyestuffs in which the NHR group, instead of being attached to the naphthalene nucleus, is attached to a benzoylamino or anilino group which is attached to the 6-, 7- or 8-position of the naphthalene nucleus.

Particularly valuable dyestuffs are obtained from those compounds wherein $D_1$ represents a sulphonated phenyl or naphthyl radical, especially those which contain a —$SO_3H$ group in ortho position to the azo link; the phenyl radical may be further substituted for example by halogen atoms such as chlorine, alkyl radicals such as methyl, acylamino groups such as acetylamino and alkoxy radicals such as methoxy.

(2) Disazo compounds of Formula II, wherein $D_1$ stands for a radical of the azobenzene, azonaphthalene or phenylazonaphthalene series and the naphthalene nucleus is substituted by the NHR group, and optionally by sulphonic acid as in class 1.

(3) Monazo compounds of the formula:

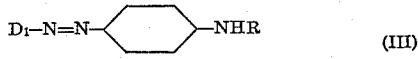

(III)

wherein $D_1$ stands for a mono- or dicyclic aryl radical as described for class 1 and is preferably a disulphonaphthyl or a stilbene radical, and the benzene nucleus may contain further substituents such as halogen atoms, or alkyl, alkoxy, carboxylic acid and acylamino groups.

(4) Mono- or disazo compounds of the formula:

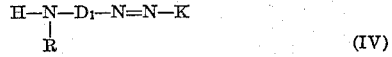

(IV)

wherein $D_1$ represents an arylene radical such as the radical of the azobenzene, azonaphthalene or phenylazonaphthalene series, or, preferably, an at most dicyclic arylene radical of the benzene or naphthalene series, and K represents the radical of a naphthol sulphonic acid or the radical of an enolised or enolisable ketomethylene compound (such as an acetoacetarylide or a 5-pyrazolone) having the OH group o- to the azo group. $D_1$ preferably represents a radical of the benzene series containing a sulphonic acid group.

(5) Mono- or disazo compounds of the formula:

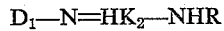

wherein $D_1$ represents a radical of the type defined for $D_1$ in classes 1 and 2 above and $K_2$ represents the radical of an enolisable ketomethylene compound (such as an acetoacetarylide or a 5-pyrazolone) having the —OH group in α-position to the azo group.

(6) The metal complex, e.g. the copper, chromium and cobalt complex, compounds of those dyes of Formulae II, IV and V (wherein $D_1$, K and $K_2$ have all the respective meanings stated) which contain a metallisable (for example, a hydroxyl, lower alkoxy or carboxylic acid) group ortho to the azo group in $D_1$.

(7) Anthraquinone compounds of the formula:

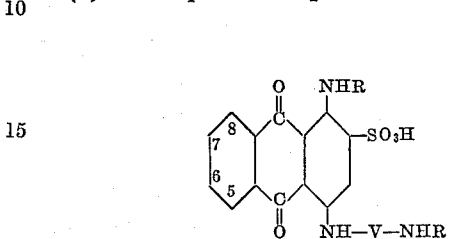

wherein the anthraquinone nucleus may contain an additional sulphonic acid group in the 5-, 6-, 7- or 8-position and V represents a bridging group which is preferably a divalent radical of the benzene series, for example phenylene, diphenylene, or 4,4'-divalent stilbene or azobenzene radicals. It is preferred that V should contain one sulphonic acid group for each benzene ring present.

(8) Phthalocyanine compounds of the formula:

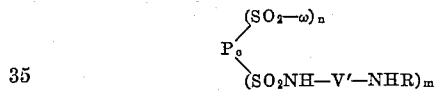

wherein Pc represents the phthalocyanine nucleus preferably of copper phthalocyanine, ω represents a hydroxy and/or a substituted or unsubstituted amino group, V' represents a bridging group, preferably an alphatic, cycloaliphatic or aromatic bridging group, n and m each represent 1, 2 or 3 and may be the same or different provided that $n+m$ is not greater than 4.

(9) Nitro dyestuffs of the formula:

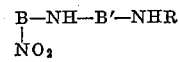

wherein B and B' represent monocyclic aryl nuclei, the nitro group in B being ortho to the NH group.

In class 1:
6-amino-1-hydroxy - 2 - (2' - sulphophenylazo)naphthalene-3-sulphonic acid,
6 - methylamino - 1 - hydroxy - 2 - (4'-acetylamino-2'-sulphophenylazo)naphthalene-3-sulphonic acid,
8 - amino - 1 - hydroxy-2-(2'-sulphophenylazo)naphthalene-3:6-disulphonic acid,
8 - amino - 1 - hydroxy - 2 - (4'-chloro-2'-sulphophenylazo)-naphthalene-3:5-disulphonic acid,
7 - amino - 2 - (2'5'-disulphophenylazo)-1 - hydroxynaphthalene-3-sulphonic acid,
7 - methylamino - 2 - (2' - sulphophenylazo) - 1 - hydroxy-naphthalene-3-sulphonic acid,
7 - methylaino - 2 - (4' - methoxy - 2' - sulphophenylazo)-1-hydroxynaphthalene-3-sulphonic acid,
8 - (3' - aminobenzoylamino) - 1 - hydroxy - 2 - (2'-sulphophenylazo)naphthalene-3:6-disulphonic acid,
8 - amino - 1 - hydroxy - 2:2' - azonaphthalene - 1':3:5':6-tetrasulphonic acid,
8 - amino - 1 - hydroxy - 2:2' - azonaphthalene - 1':3:5'-trisulphonic acid,
6 - amino - 1 - hydroxy - 2:2' - azonaphthalene - 1':3:5'-trisulphonic acid, 6 - methylamino - 1 - hydroxy - 2:2' - azonaphthalene-1':3:5'-trisulphonic acid,
7 - amino - 1 - hydroxy - 2:2'-azonaphthalene-1':3-disulphonic acid,
8 - amino - 1 - hydroxy - 2 - (4'-hydroxy - 3' - carboxyphenylazo)-naphthalene-3:6-disulphonic acid,
6 - amino - 1 - hydroxy - 2 - (4' - hydroxy - 3' - carboxyphenylazo)-naphthalene-3:5-disulphonic acid, In class 2:
8 - amino - 1 - hydroxy 2 - [4'-(2''-sulphophenylazo)-2'-methoxy-5'-methylphenylazo]naphthalene - 3:6 - disulphonic acid,
8 - amino - 1 - hydroxy - 2 - [4'-(4'' - methoxyphenylazo)-2'-carboxyphenylazo]naphthalene - 3:6 - disulphonic acid,
8 - amino - 1 - hydroxy - 2 - [4'-(2''-hydroxy - 3'':6''-disulpho-1''naphthylazo) 2' - carboxyphenylazo]naphthalene-3:6-disulphonic acid,
4,4' - bis(8'' - amino - 1'' - hydroxy - 3'':6'' - disulpho-2''-naphthylazo) - 3:3' - dimethoxydiphenyl,
6 - amino - 1 - hydroxy - 2 - [4' - (2'' - sulphophenylazo)-2'-methoxy-5'-methylphenylazo]naphthalene -3:5-disulphonic acid, In class 3:
2 - (4' - amino - 2' - methylphenylazo)naphthalene - 4:8-disulphonic acid,
2 - (4' - amino - 2' - acetylaminophenylazo)naphthalene-5:7-disulphonic acid,
4 - nitro - 4' - (4'' - methylaminophenylazo)stilbene - 2:2'-disulphonic acid,
4 - nitro - 4' - (4'' - amino - 2'' - methyl - 5'' - methoxyphenylazo)-stilbene-2:2'-disulphonic acid,
4 - amino - 4' - (4'' - methoxyphenylazo)stilbene - 2:2'-disulphonic acid,
4 - amino - 2 - methylazobenzene - 2':5'-disulphonic acid.

In class 4:
1 - (2':5' - dichloro - 4'-sulphophenyl) - 3 - methyl-4-(3''-amino-4''-sulphophenylazo)-5-pyrazolone,
1 - (4' - sulphophenyl) - 3 - carboxy - 4 - (4'' - amino-3''-sulphophenylazo)-5-pyrazolone,
1 - (2' - methyl - 5 - sulphophenyl) - 3 - methyl - 4-(4''-amino-3''-sulphophenylazo)-5-pyrazolone,
1 - (2' - sulphophenyl) - 3 - methyl - 4 - (3'' - amino-4''-sulphophenylazo)-5-pyrazolone,
4 - amino - 4' - (3'' - methyl - 1'' - phenyl - 4'' - pyrazol-5''-onylazo)stilbene-2:2'-disulphonic acid,
4 - amino - 4' - (2'' - hydroxy - 3'':6'' - disulpho - 1''-naphthylazo)stilbene-2:2'-disulphonic acid,
8 - acetylamino - 1 - hydroxy - 2 - (3' - amino - 4' - sulphophenylazo)naphthalene-3:6-disulphonic acid,
7 - (3' - sulphophenylamino) - 1 - hydroxy - 2 - (4'-amino-2'-carboxyphenylazo)naphthalene-3-sulphonic acid,
8 - phenylamino - 1 - hydroxy - 2 - (4' - amino - 2' - sulphophenylazo)naphthalene-3:6-disulphonic acid,
6 acetylamino - 1 - hydroxy - 2 - (5' - amino - 2'-sulphophenylazo)naphthalene-3-sulphonic acid.

In class 5:
1-(3'-aminophenyl)-3-methyl-4 - (2':5' - disulphophenylazo)-5-pyrazolone,
1-(3'-aminophenyl)-3-carboxy-4-(2'-carboxy - 4' - sulphophenylazo)-5-pyrazolone,
4-amino-4'-[3''-methyl-4''-(2''':5''' - disulphophenylazo)-1''-pyrazol-5''-onyl]stilbene-2:2'-disulphonic acid,
1-(3'-aminophenyl)-3-carboxy-4-[2''':5''' - disulphophenylazo)-2''-methoxy-5''-methylphenylazo] - 5 - pyrazolone.

In class 6:
The copper complex of 8-amino-1-hydroxy-2-(2'-hydroxy-5'-sulphophenylazo)naphthalene-3:6-disulphonic acid,
The copper complex of 6-amino-1-hydroxy-2-(2'-hydroxy-5'-sulphophenylazo)naphthalene-3-sulphonic acid,
The copper complex of 6-amino-1-hydroxy-2-(2'-hydroxy-5'-sulphophenylazo)naphthalene-3:5-disulphonic acid,
The copper complex of 8-amino-1-hydroxy-2-(2'-hydroxy-3'-chloro-5'-sulphophenylazo)naphthalene - 3:6 - disulphonic acid,
The copper complex of 6-methylamino-1-hydroxy-2-(2'-carboxy-5'-sulphophenylazo)naphthalene - 3 - sulphonic acid,
The copper complex of 8-amino-1-hydroxy-2-[4'-(2''-sulphophenylazo)-2'-methoxy - 5' - methylphenylazo]naphthalene-3:6-disulphonic acid,
The copper complex of 6-amino-1-hydroxy-2-[4'-(2''':5''' - disulphophenylazo)-2'-methoxy-5' - methylphenylazo]naphthalene-3:5-disulphonic acid,
The copper complex of 1-(3'-amino-4'-sulphophenyl)-3-methyl-4-[4'' - (2''':5''' - disulphophenylazo)-2''-methoxy-5''-methylphenylazo]-5-pyrazolone,
The copper complex of 7-(4'-amino-3'-sulphoanilino)-1-hydroxy-2-[4'-(2''':5''' - disulphophenylazo)-2''-methoxy-5''-methylphenylazo]naphthalene-3-sulphonic acid,
The copper complex of 6-(4'-amino-3'-sulphoanilino)-1-hydroxy-2 - (2'' - carboxyphenylazo)naphthalene-3-sulphonic acid,
The 1:2-chromium complex of 7-amino-6'-nitro-1:2'-dihydroxy-2:1'-azonaphthalene-3:4'-disulphonic acid,
The 1:2-chromium complex of 6-amino-1-hydroxy-2-(2'-carboxyphenylazo)naphthalene-3-sulphonic acid,
The 1:2-chromium complex of 8-amino-1-hydroxy-2(4'-nitro - 2' - hydroxyphenylazo)naphthalene-3:6 - disulphonic acid,
The 1:2-cobalt complex of 6-(4'-amino-3'-sulphoanilino)-1-hydroxy-2-(5''-chloro - 2'' - hydroxyphenylazo)naphthalene-3-sulphonic acid,
The 1.2-chromium complex of 1-(3'-amino-4'-sulphophenyl)-3-methyl-4-(2''-hydroxy - 4'' - sulpho-1''-naphthylazo)-5-pyrazolone,
The 1:2-chromium complex of 7-(4'-sulphoanilino)-1-hydroxy-2-(4''-amino - 2'' - carboxyphenylazo)naphthalene-3-sulphonic acid,
The 1:2-chromium complex of 1(3'-aminophenyl)-3-methyl-4-(4''-nitro-2''-carboxyphenylazo)-5-pyrazolone.

In class 7:
1-amino-4-(3'-amino - 4' - sulphoanilino)anthraquinone-2-sulphonic acid,
1-amino-4-(4'-amino - 3' - sulphoanilino)anthraquinone-2:5-disulphonic acid,
1-amino-4-[4' - (4'' - amino - 3'' - sulphophenyl)anilino]-anthraquinone-2:5-disulphonic acid,
1-amino-4-[4'-(4''-amino - 2'' - sulphophenylazo)anilino]-anthraquinone-2:5-disulphonic acid,
1-amino-4-(4'-methylamino - 3' - sulphoanilino)anthraquinone-2-sulphonic acid.

In class 8:
3-(3'-amino-4'-sulphophenyl)sulphamyl copper phthalocyanine-tri-3-sulphonic acid,
Di-4-(3'-amino-4'-sulphophenyl)sulphamyl copper phthalocyanine-di-4-sulphonic acid,
3-(3'-aminophenylsulphamyl)-3-sulphamyl copper phthalocyanine-di-3-sulphonic acid.

In class 9:
4-amino-2'-nitrodiphenylamine-3:4'-disulphonic acid.

In the process of the invention the compound of Formula I can react with one or more of the halogen atoms or labile groups present in the 1:3:5-triazine or pyrimidine, and the resulting compound can react with the —AH group present in the dyestuff compound by replacement of a

group and/or a halogen atom or labile group present in the said compound.

Thus when the compound of Formula I is an ester of malonic acid and the 1:3:5-triazine containing at least 2 halogen atoms and/or labile groups is cyanuric chloride it is believed that the reaction proceeds as follows:

groups, as hereinbefore defined, and with a compound of Formula I.

This modified process of the invention may be conveniently brought about by adding sodium nitrite to a solution

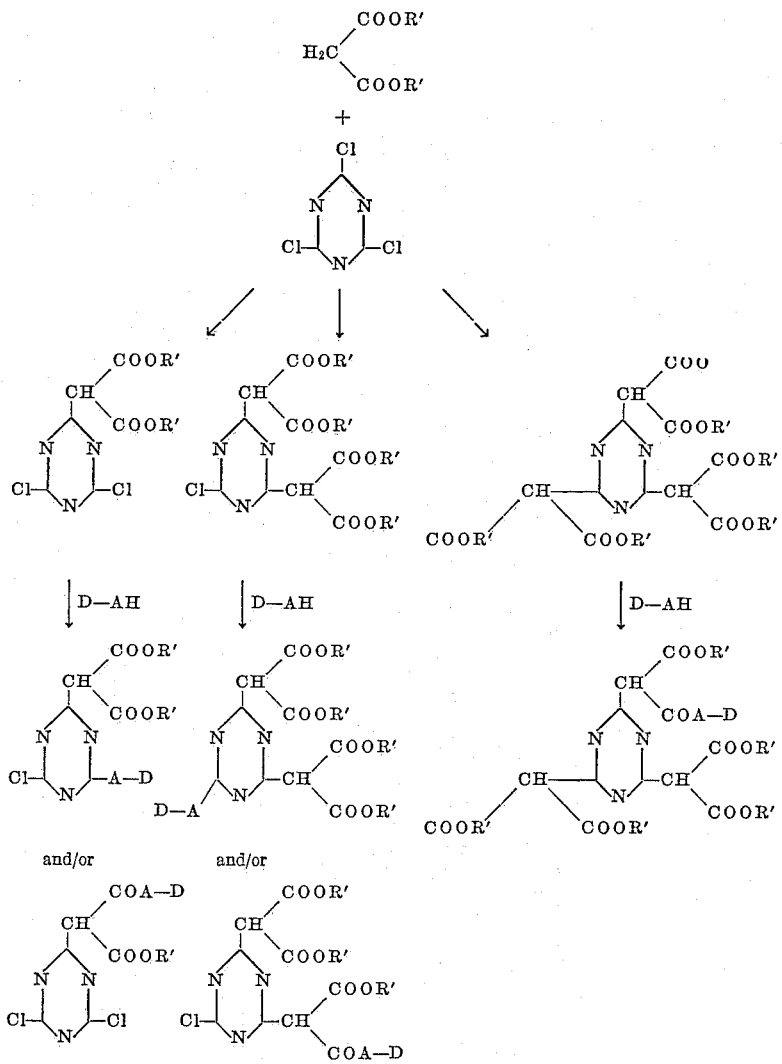

In the above formulae R' has the meaning already given and D is used to represent the residue of a dyestuff compound.

The reaction is carried out under such conditions that at least one

group and preferably also a halogen atom or labile group is attached to the triazine or pyrimidine ring or rings present in the resulting dyestuff.

According to a further feature of the invention there is provided a modified process for the manufacture of azo dyestuffs which comprises diazotising a primary aromatic amine, which may be an aminoazo compound, and coupling the resulting diazo compound with a coupling component, wherein either the primary aromatic amine and/or the coupling component contains a group of the formula AH where A represents —O—, —S— or —NR— and R represents a hydrogen atom or a cycloalkyl radical or a substituted or unsubstituted alkyl radical which has previously been reacted with a 1:3:5-triazine or pyrimidine which contains at least two halogen atoms and/or labile or suspension of the primary aromatic amine, or the corresponding sulphamic acid, in a dilute aqueous solution of hydrochloric acid, adding the resulting aqueous solution or suspension of the diazo compound to an aqueous solution of the coupling component and isolating, by conventional methods, the azo dyestuff which is obtained.

If desired the formation of azo dyestuffs by the modified process of the invention may be carried out in situ on a textile material by applying to the textile material a primary aromatic amine which contains a —AH group which has previously been reacted with a 1:3:5-triazine or pyrimidine which contains at least 2 halogen atoms and/or labile groups and with a compound of Formula I, treating the textile material with an aqueous solution of nitrous acid and thereafter treating the textile material with an aqueous solution of a coupling component. Alternatively the textile material can be treated with a coupling component which contains a —AH group which has previously been reacted with a 1:3:5-triazine or pyrimidine which contains at least 2 halogen atoms and/or labile groups and with a compound of Formula I, and subsequently treating the textile material with an aqueous solution or suspension of a diazo or tetrazo compound.

The primary aromatic amine used in this modified process of the invention may be a member of any of the known series of diazotisable amines but preferably it is a primary aromatic amine of the benzene or naphthalene series, which optionally contains an azo group. The coupling component used in this modified process of the invention may be a member of any of the known series of coupling components but preferably it is a coupling component of the phenol, naphthol, acylacetarylide, 5-pyrazolone or arylamine series.

Those primary aromatic amines or coupling components which contain —AH group which has previously been reacted with one of the said 1:3:5-triazines or pyrimidines and with a compound of Formula I may themselves be obtained by reacting one of the said 1:3:5-triazines or pyrimidines with a sodium derivative of a compound of Formula I and reacting the resulting compound with the corresponding primary aromatic amine or nitro compound or coupling component which contains a —AH group, and subsequently reducing the nitro group to an amino group.

If desired those dyestuffs obtained by the process of the invention which still contain a halogen atom attached to the 1:3:5-triazine or pyrimidine ring present in the said dyestuffs may be subsequently treated with compounds which are capable of replacing the said halogen atom by a group. As examples of such groups there may be mentioned amino, mono- or disubstituted amino groups, alkoxy, aryloxy, alkylthio, arylthio, mercapto sulphonic acid, thiocyano and groups of the formula:

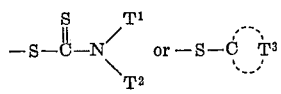

wherein $T^1$, $T^2$ and $T^3$ have the meanings stated above.

As specific examples of compounds which may be reacted with those dyestuffs which contain a halogen atom attached to a 1:3:5-triazine or pyrimidine present in the dyestuffs there may be mentioned methanol, ethanol, phenol, sodium phenol-4-sulphonate, ammonia, methylamine, diethylamine, aniline, aniline-2-, -3- or -4-sulphonic acid, aniline-2:5- or -3:5-disulphonic acid, methylmercaptan, phenylmercaptan, sodium sulphite, potassium thiocyanate, sodium diethyldithiocarbamate, sodium N-methyl-N-phenyldithiocarbamate, 2-mercaptobenzoxazole, 2-mercaptobenzthiazole, 2-mercaptobenzselenazole, 2- or 4-mercaptopyridine and 2-mercaptobenziminazole.

If desired the new dyestuffs can be isolated from the medium in which they have been formed and/or subsequently dried in the presence of a buffering agent. As examples of buffering agents which can be used for this purpose there may be mentioned buffering agents derived from phosphates such as sodium dihydrogen phosphate and disodium hydrogen phosphate, citrates such as sodium citrate, borates, and salts of dialkylmetanilic acids such as sodium diethylmetanilate which is preferably used in conjunction with sodium hydrogen sulphate.

The new dyestuffs obtained by the process of the invention are valuable for colouring natural and artificial textile materials for example textile materials comprising cotton, viscose rayon, regenerated cellulose, wool, silk, cellulose acetate, polyamides, polyacrylonitrile, modified polyacrylonitrile, and aromatic polyester fibres. For this purpose the dyestuffs can be applied to the textile materials by dyeing, padding or printing using printing pastes containing the conventional thickening agents or oil-in-water emulsions or water-in-oil emulsions, whereby the textile materials are coloured in bright shades possessing excellent fastness to wet treatments such as washing.

The new dyestuffs which contain water-solubilising groups, for example sulphonic acid and carboxylic acid groups, which render them soluble in water are particularly valuable for colouring cellulose textile materials. For this purpose the dyestuffs are preferably applied to the cellulose textile material in conjunction with a treatment with an acid-binding agent, for example sodium carbonate, sodium metasilicate, trisodium phosphate or sodium hydroxide, which may be applied to the cellulose textile material before, during or after the application of the dyestuff. Alternatively when the dyed textile material is to be subsequently heated or steamed a substance such as sodium bicarbonate or sodium trichloroacetate, which on heating or steaming liberates an acid-binding agent can be used.

For example the cellulose textile material can be coloured by treating the cellulose textile material with an aqueous solution or suspension of the acid-binding agent and then immersing the so-treated cellulose textile material in a dyebath comprising a solution of one or more of the new dystuffs at a temperature of between 0° and 100° C., removing the dyed cellulose textile material from the dyebath and if desired subjecting the dyed cellulose textile material to a treatment in a hot aqueous solution of soap.

If desired the cellulose textile material which has been treated with an aqueous solution or suspension of the acid-binding agent may be passed between rollers to remove excess aqueous solution or suspension of the acid-bindnig agent and/or dried before being treated with the aqueous solution of the said dyestuffs.

Alternatively the aqueous solution of the dyestuff may be applied by padding to the cellulose textile material which has been treated with the acid-binding agent and the cellulose textile material then passed through rollers and subsequently subjected to the action of heat or steam. Alternatively the cellulose textile material can be padded with an aqueous solution of one or more of the new dyestuffs which also contains an acid-binding agent, passing the so-treated cellulose textile material through rollers, then if desired drying the cellulose textile material at a suitable temperature, for example 70° C., and then subjecting the cellulose textile material to the action of heat or steam. Alternatively the cellulose textile material can be dyed by immersing it in a dyebath comprising an aqueous solution of one or more of the said dyestuffs which also contains an acid-binding agent, at a suitable temperature for example between 0° and 100° C,. and thereafter removing the cellulose textile material from the dyebath, if desired subjecting it to a treatment in a hot aqueous solution of soap and finally drying the dyed cellulose textile material. Alternatively the aqueous solution of one or more of the said dyestuffs can be applied to the cellulose textile material by a dyeing or a padding method and the coloured cellulose textile material subsequently immersed in an aqueous solution or suspension of the acid-binding agent, preferably at a temperature between 50° C. and 100° C., or alternatively the coloured cellulose textile material may be padded with an aqueous solution or suspension of the acid-binding agent, the textile material dried and then subjected to the action of heat or steam. Alternatively the cellulose textile material can be dyed by immersing it in a dyebath comprising an aqueous solution of one or more of the said dyestuffs, preferably at a temperature between 20° and 100° C., and, after the textile material has absorbed some or all of the dyestuffs, adding an acid-binding agent and proceeding with the dyeing at the same or a different temperature.

The concentration of the acid-binding agent present in the aqueous solution of the dyestuffs is not critical but it is preferred to use between 0.1% and 10% of the acid-binding agent based on the total weight of the aqueous solution. If desired the aqueous solution or suspension of the acid-binding agent may also contain further substances, for example electrolytes such as sodium chloride and sodium sulphate.

The aqueous solution of one or more of the said dyestuffs may also contain substances which are known to assist the application of dyestuffs to textile materials, for example sodium chloride, sodium sulphate, urea, dispersing agents, surface-active agents, sodium alginate or an emulsion of an organic liquid, for example trichloroethylene in water.

Alternatively the cellulose textile materials can be printed with a printing paste containing one or more of the new dyestuffs obtained by the process of the invention.

This may be conveniently brought about by applying a printing paste containing one or more of the said dyestuffs, to a cellulose textile material which has been impregnated with an acid-binding agent and thereafter subjecting the printed cellulose textile material to the action of heat or steam. Alternatively a printing paste containing one or more of the said dyestuffs and containing an acid-binding agent can be applied to the cellulose textile material and the printed paste containing one or more of the said dyestuffs can be applied to the cellulose textile material which is subsequently immersed in a hot aqueous solution or suspension of the acid-binding agent or alternatively the printed textile material is impregnated with an aqueous solution or suspension of the acid-binding agent and subsequently subjected to the action of heat or steam.

After applying the printing paste to the cellulose textile material the printed textile material may, if desired, be dried, for example at a temperature between 20° and 100° C. before the printed textile material is subjected to the action of heat or steam.

The cellulose textile material may be printed with the printing paste by any of the commonly known methods of applying printing pastes to textile materials, for example by means of roller printing, screen printing, block printing, spray printing or stencil printing. The printing pastes may also contain the commonly used adjuvants, for example urea, thickening agents, for example methyl cellulose, starch, locust bean gum, sodium aginate, water-in oil emulsions, oil-in-water emulsions, surface-active agents, sodium m-nitrobenzene sulphonate, and organic liquids, for example ethanol.

At the conclusion of the dyeing and/or printing processes it is preferred to subject the so-coloured cellulose textile materials to a "soaping" treatment, which may be carried out by immersing the coloured cellulose textile materials for a short time, for example 15 minutes, in a hot aqueous solution of soap and/or detergent, and subsequently rinsing the coloured cellulose textile material in water before drying it.

Those dyestuffs which do not contain water-solubilising groups for example sulphonic acid, carboxylic acid, sulphonamide and acylsulphonamide groups are, in general, applied to textile materials in the form of an aqueous dispersion which may be obtained by gravel milling the dyestuff with water in the presence of a dispersing agent, for example the sodium salt of sulphonated naphthalene formaldehyde condensation products, sulphosuccinic acid esters, Turkey red oil, alkyl phenol/ethylene oxide condensation products, soap and similar surface-active materials with or without protective colloids such as dextrin, British gum and water-soluble proteins. If desired the aqueous paste of the dyestuffs so obtained may be dried to form a redispersible powder which may be converted to a nondusting powder by any of the processes known for forming non-dusting powders.

The dyestuffs can be applied to nitrogen-containing textile materials such as wool and polyamide textile materials, from a mildly alkaline, neutral or acid dyebath. The dyeing process can be carried out at a constant or substantially constant pH, that is to say the pH of the dyebath remains constant or substantially constant during the dyeing process, or if desired the pH of the dyebath can be altered at any stage of the dyeing process by the addition of acids or acid salts or alkalis or alkaline salts. For example dyeing may be started at a dyebath pH of about 3.5 to 5.5 and raised during the dyeing process to about 6.5 to 7.5 or higher if desired. The dyebath may also contain substances which are commonly used in the dyeing of nitrogen-containing textile materials. As examples of such substances there may be mentioned ammonium acetate, sodium sulphate, ethyl tartrate, non-ionic dispersing agents such as condensates of ethylene oxide with amines, fatty alcohols or phenols, surface-active cationic agents such as quaternary ammonium salts for example cetyl trimethylammonium bromide and cetyl pyrimidinium bromide and organic liquids such as n-butanol and benzyl alcohol.

Alternatively the dye stuffs can be applied to textile materials, which are preferably cellulose textile materials, in conjunction with a treatment with a resin-forming composition and an acid-catalyst whereby the textile material is simultaneously coloured and rendered resistant to creasing. This colouring process may be conveniently carried out by padding or printing the textile material with an aqueous solution containing (a) a new dyestuff, as hereinbefore defined, (b) a resin forming composition and (c) an acid-catalyst, optionally drying the treated textile material, and subsequently heating the textile material at a temperature above 100° C., preferably at a temperature between 130° and 170° C..

As examples of resin-forming compositions there may be mentioned epoxy resins, polyisocyanates, condensates of formaldehyde with cresols or with acrolein, and in particular mixtures comprising the methylol derivatives or lower alkyl ethers of methylol derivatives of monomeric or polymeric compounds containing a plurality of amino- or monosubstituted amino groups said compounds being known from the art or used in practice for the formation of resins by condensation with formaldehyde. Such compounds include, for example, monomeric nitrogen compounds such as urea, thiourea, substituted ureas and thioureas, dicyandiamide, dicyandiamidine, biguanides, amides, carbamates, allophanates and heterocyclic compounds such as aminotriazines, urons, ureins, ureides, imidazolidones, triazones and hydantoins, or mixtures of such compounds, and polymeric nitrogen compounds such as the polymeric amides made by the reaction of dibasic acids with diamines. The lower alkyl ethers of the methylol derivatives of these compounds include for example the methyl, ethyl, propyl and butyl ethers.

The quantity of the resin-forming composition which is present in the aqueous solution used in this colouring process usually amounts to between 3% and 30% by weight of the aqueous solution and is preferably between 5% and 20% by weight of the aqueous solution.

As examples of acid-catalysts there may be mentioned salts from weak bases and mineral acids such as zinc chloride, ammonium sulphate, ammonium nitrate, ammonium chloride and magnesium chloride and mineral acid salts of organic amines, which are preferably primary or secondary organic amines which contain at least one alkyl chain carrying at least one hydroxy group. As specific examples of such primary or secondary amines containing one or two hydroxyalkyl groups there may be mentioned β-hydroxyethylamine, N-methyl-N-(β-hydroxyethyl)amine, N-ethyl-N-(β-hydroxyethyl)amine, γ-hydroxypropylamine, β-hydroxypropylamine, β-, γ- or δ-hydroxy-n-butylamine, N:N - di-β-hydroxyethyl)amine, N:N-di(β-hydroxypropyl)amine, N-(β-hydroxyethyl)aniline or -benzylamine, β:γ-dihydroxypropylamine, N-methylglucamine (also known as N-methyl-N-pentahydroxy-N-hexylamine), N-ethyl glucamine, N-(β-hydroxyethyl)glucamine, N - methyl - N-(β:γ-dihydroxypropyl)-amine and 2-amino-1:2:3-propanetriol.

The quantity of the acid-catalyst which is present in the aqueous solution usually amounts to between 0.25% and 5% by weight of the aqueous solution and is preferably between 0.5% and 1.5% by weight of the aqueous solution.

The invention is illustrated but not limited by the following examples in which the parts and percentages are by weight:

Example 1

A solution of 23.25 parts of the disodium salt of 2-(2'-methyl-4'-aminophenylazo)naphthalene - 4:8-disulphonic acid in 320 parts of water is added to a suspension of 20.5 parts of diethyl-α-(4:6-dichloro-1:3:5-triazin-2-yl)malonate in a mixture of 80 parts of dioxan, 35 parts of water and 160 parts of ice, and the resulting mixture is stirred for 1 hour at 5° C., the pH of the mixture being maintained between 6.0 and 6.5 by the addition of sodium carbonate. 120 parts of sodium chloride are then added and the precipitated dyestuff is filtered off. The dyestuff is then mixed with 3.03 parts of potassium dihydrogen phosphate and 1.71 parts of disodium hydrogen phosphate and the resulting mixture is dried.

On analysis the dyestuff is found to contain 1.1 atoms of organically bound chlorine per molecule of dyestuff, and consists essentially of the dyestuff of the formula:

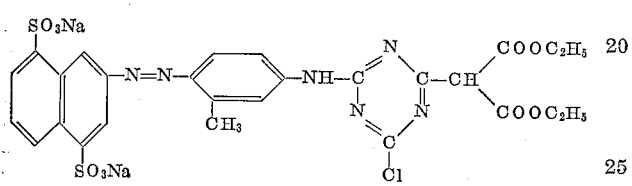

When applied to cellulose textile materials in conjunction with a treatment with an acid-binding agent the dyestuff yields yellow shades possessing excellent fastness to wet treatments.

The diethyl α-(4:6-dichloro-1:3:5-triazin-2-yl)malonate used in the above example may be obtained as follows:

A mixture of 1.15 parts of sodium, 30 parts of dioxan and 8 parts of diethylmalonate is stirred for 3 hours at a temperature of 100° C. The resulting solution is cooled to 20° C. and is added, during 30 minutes, to a solution of 9.175 parts of cyanuric chloride in 30 parts of dioxan. The mixture is then heated to the boiling point during 1 hour and the mixture is cooled. The mixture is filtered and the resulting filtrate is distilled to remove the dioxan, leaving a residual oil of diethyl α-(4:6-dichloro-1:3:5-triazin-2-yl)malonate.

Example 2

In place of the 23.25 parts of the disodium salt of the azo compound used in Example 1 there are used 28.45 parts of the trisodium salt of 1-amino-7-(o-sulphophenylazo)-8-naphthol-3:6-disulphonic acid whereby a dyestuff is obtained which consists essentially of

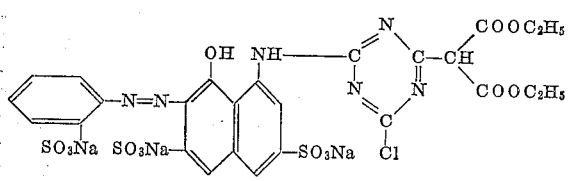

When applied to cellulose textile materials in conjunction with a treatment with an acid-binding agent the dyestuff yields red shades possessing excellent fastness to wet treatments.

Example 3

A mixture of 23.25 parts of the disodium salt of 2-(2'-methyl - 4' - aminophenylazo)naphthalene-4:8-disulphonic acid, 33.3 parts of 2:4:6-tri[bis(carboethoxy)methyl]-1:3:5-triazine (which may be obtained as described in volume 49 (2) of The Journal fur Praktische Chemie at page 90), 360 parts of dioxan and 320 parts of water is stirred for 15 hours at the boil under a reflux condenser. The resulting solution is cooled at 20° C., 68 parts of sodium chloride are added and the precipitated dyestuff is filtered off and dried.

The dyestuff consists essentially of

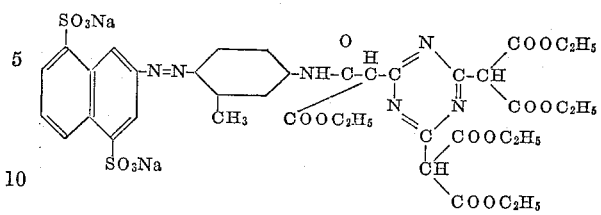

When applied to cellulose textile materials in conjunction with a treatment with an acid-binding agent the dyestuff yields yellow shades possessing excellent fastness to wet treatments.

Example 4

A solution of 23.25 parts of the disodium salt of 2-(2'-methyl - 4'-aminophenylazo)naphthalene-4:8-disulphonic acid in 320 parts of water is added, during 30 minutes, to a suspension of 28.75 parts of 2-chloro-4:6-di[bis(carboethoxy)methyl]-1:3:5-triazine in a mixture of 250 parts of dioxan, 32 parts of water and 130 parts of ice. The resulting mixture is stirred for 15 minutes at 5° C. and then for 15 minutes at 60° C. Sodium carbonate is then added until the pH of the mixture is 6.5, the mixture is cooled to 20° C., 120 parts of sodium chloride are added and the precipitated dyestuff is filtered off, washed with a 20% aqueous solution of sodium chloride and dried. The dyestuff so obtained consists essentially of

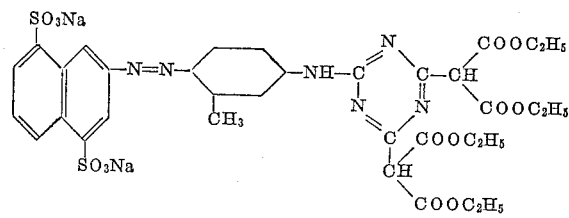

When applied to cellulose textile materials in conjunction with a treatment with an acid-binding agent the dyestuff yields yellow shades possessing excellent fastness to wet treatments.

The 2 - chloro-4:6-di[bis(carboethoxy)methyl]-1:3:5-triazine used in the above example may be obtained as follows:

A mixture of 2.3 parts of sodium, 70 parts of dioxan and 16 parts of diethylmalonate is stirred for 3 hours at a temperature of 100° C. The resulting solution is cooled to 20° C. and is then added, during 30 minutes, to a solution of 9.175 parts of cyanuric chloride in 70 parts of dioxan. The resulting mixture is stirred for 1 hour at 20° C. and then for 1 hour at the boil under a reflux condenser. The mixture is then cooled, filtered and the filtrate distilled at reduced pressure to remove the dioxan, leaving a residual oil of 2-chloro-4:6-di[bis(carboethoxy)methyl]-1:3:5-triazine. On analysis the product is found to contain 8.45% of chlorine; $C_{17}H_{22}O_8N_3Cl$ requires 8.25% of chlorine.

Example 5

A solution of 23.25 parts of the disodium salt of 2-(2'-methyl-4'-aminophenylazo)naphthalene-4:8 - disulphonic acid in 320 parts of water is added to a suspension of 13.65 parts of 3-(4':6'-dichloro-1':3':5'-triazin-2'-yl)pentane-2:4-dione in a mixture of 50 parts of acetone and 150 parts of water, and the resulting mixture is then stirred for 1 hour at 20° C., the pH of the mixture being maintained between 6.0 and 6.5 by the addition of sodium carbonate. 110 parts of sodium chloride are then added and the precipitated dyestuff is filtered off and dried. On analysis the dyestuff is found to contain 1.0 atom of organically bound chlorine per molecule of dyestuff and consists essentially of the dyestuff of the formula:

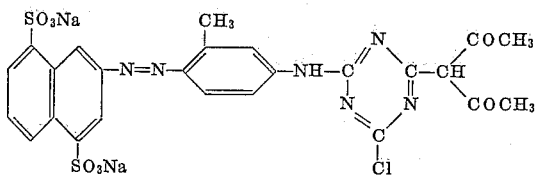

When applied to cellulose textile materials in conjunction with a treatment with an acid-binding agent the dyestuff yields yellow shades possessing excellent fastness to wet treatments.

The 3-(4':6'-dichloro-1':3:5'-triazin-6'-yl)pentane-2:4-dione used in the above example may be obtained as follows:

A mixture of 1.72 parts of sodium, 125 parts of ether and 7.5 parts of acetylacetone is stirred at 20° C. until all the sodium has reacted with the acetylacetone. The resulting mixture is then added to a solution of 9.2 parts of cyanuric chloride in 120 parts of ether and the mixture is then stirred for 10 hours at the boil under a reflux condenser. The mixture is cooled to 10° C., then shaken with a mixture of 150 parts of water and 5 parts of a concentrated aqueous solution of hydrochloric acid, and the ethereal layer is separated. The ether solution is dried and the ether removed by distillation. The residual solid crystallises from a light petroleum ether (which boils between 100° and 120° C.) in the form of colourless needles which melt between 122° and 123° C. On analysis the product is found to contain 38.9% of carbon, 2.9% of hydrogen, 16.5% of nitrogen and 28.5% of chlorine. $C_8H_7N_3O_2Cl_2$ requires 38.7% of carbon, 2.85% of hydrogen, 16.95% of nitrogen and 28.6% of chlorine.

*Example 6*

In place of the 23.25 parts of the disodium salt of the azo compound used in Example 5 there are used 28.45 parts of the trisodium salt of 1-amino-7-(o-sulphophenylazo)-8-naphthol-3:6-disulphonic acid whereby a dyestuff is obtained which consists essentially of the dyestuff of the formula:

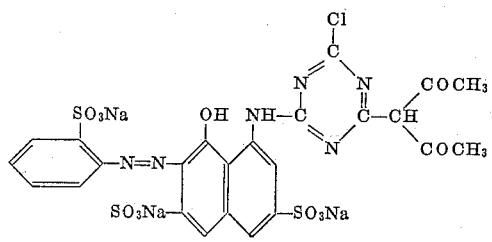

When applied to cellulose textile materials in conjunction with a treatment with an acid-binding agent the dyestuff yields red shades possessing excellent fastness to wet treatments.

*Example 7*

A solution of 23.25 parts of the disodium salt of 2-(2'-methyl-4'-aminophenylazo)naphthalene - 4:8 - disulphonic acid in 320 parts of water is added to a suspension of 17.15 parts of 2-chloro-4:6-di[bis(acetyl)methyl]-1:3:5-triazine in a mixture of 250 parts of dioxan and 150 parts of water. The resulting mixture is stirred for 30 minutes at 55° C., the pH of the mixture being maintained between 6.0 and 6.5 by the addition of sodium carbonate. The mixture is cooled to 20° C., 100 parts of sodium chloride are then added and the precipitated dyestuff is filtered off, washed with a 20% aqueous solution of sodium chloride and dried. The dyestuff so obtained consists essentially of the dyestuff of the formula:

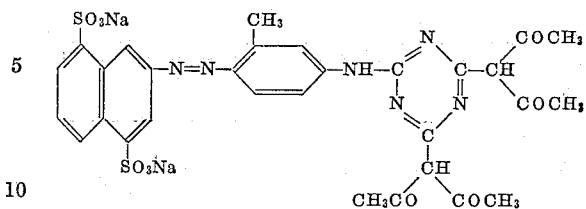

When applied to cellulose textile materials in conjunction with a treatment with an acid-binding agent the dyestuff yields yellow shades possessing excellent fastness to wet treatments.

The 2 - chloro-4:5-di[bis(acetyl)methyl]-1:3:5-triazine used in the above example may be obtained as follows:

A mixture of 2.3 parts of sodium, 100 parts of dioxan and 10.5 parts of acetylacetone is stirred for 3 hours at a temperature of 100° C. The resulting suspension is cooled to 20° C. and is then added, during 15 minutes, to a solution of 9.175 parts of cyanuric chloride in 50 parts of dioxan. The resulting mixture is then stirred for 8 hours at the boil under a reflux condenser. The mixture is then cooled, filtered, and the residue on the filter is washed with water and then dried. The resulting solid is crystallised from acetone when 2-chloro-4:6-di[bis(acetyl)methyl]-1:3:5-triazine is obtained in the form of colourless needles which melt at 256° C. with decomposition. On analysis the product is found to contain 13.6% of nitrogen and 12.0% of chlorine. $C_{13}H_{14}N_3O_4Cl$ requires 13.5% of nitrogen and 11.5% of chlorine.

*Example 8*

A solution of 23.25 parts of the disodium salt of 2-(2'methyl - 4' - aminophenylazo)naphthalene-4:8-disulphonic acid in 320 parts of water is added to a suspension of 14.35 parts of ethyl-α-(4:6-dichloro-1:3:5-triazin-2-yl)cyanacetate in a mixture of 50 parts of acetone and 150 parts of water and the resulting mixture is stirred for 3 hours at 20° C., the pH of the mixture being maintained between 6.0 and 6.5 by the addition of sodium carbonate. 110 parts of sodium chloride are then added and the precipitated dyestuff is filtered off and dried. On analysis the dyestuff is found to contain approximately 1.0 atom of organically bound chlorine per molecule of dyestuff and consists essentially of the dyestuff of the formula:

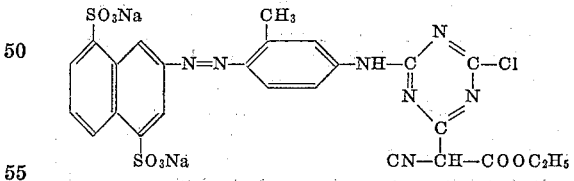

When applied to cellulose textile materials in conjunction with a treatment with an acid-binding agent the dyestuff yields yellow shades possessing excellent fastness to wet treatments.

The ethyl-α-(4:6-dichloro-1:3:5-triazin-2-yl)-cyanacetate used in the above example may be obtained as follows:

A mixture of 1.25 parts of sodium, 100 parts of ether and 6.25 parts of ethyl cyanacetate is stirred until all the sodium has reacted with the ethyl cyanacetate. The resulting mixture is then added to a solution of 9.2 parts of cyanuric chloride in 120 parts of ether, and the mixture is then stirred at the boil under a reflux condenser for 8 hours. The mixture is then cooled to 10° C., filtered, and the residue on the filter is washed with water and then dried. The resulting solid is crystallised from a mixture of chloroform and a light petroleum ether when ethyl-α-(4:6-dichloro - 1:3:5 - triazin-2-yl)-cyanacetate is obtained in the form of colourless needles which melt at 227° C.

The following table gives further examples of the new dyestuffs of the invention which are obtained in the manner described in Example 5 by condensing 3-(4':6'-dichloro-1':3':5'-triazin-2'-yl)pentane-2:4-dione with the aminoazo compounds listed in the second column of the table.

| Example | Aminoazo compound | Shade on cellulosic textile materials |
|---|---|---|
| 9 | 1-amino-7-(1'-sulpho-2'-naphthylazo)-8-naphthol-3:6-disulphonic acid. | Bluish red. |
| 10 | 1-benzoylamino-7-(3'-amino-6'-sulpho-phenylazo)-8-naphthol-3:6-disulphonic acid. | Red. |
| 11 | 2-amino-6-(2'-sulphophenylazo)-5-naphthol-7-sulphonic acid. | Orange. |
| 12 | 2-methylamino-6-(1':5'-disulpho-2'-naphthylazo)-5-naphthol-7-sulphonic acid. | Do. |
| 13 | 5-amino-2-(4':8'-disulpho-2'-naphthylazo)-acetanilide. | Yellow. |
| 14 | 2-methylamino-7-(4'-methoxy-2'-sulpho-phenylazo)-8-naphthol-6-sulphonic acid. | Red. |
| 15 | 4-methylamino-(4'-nitro-2':2''-disulpho-4'-stilbeneazo)benzene. | Yellow. |
| 16 | 1-(3'-amino-2'-methyl-5'-sulphophenyl)-3-methyl-4-(1'':5''-disulpho-2''-naphthylazo)-5-pyrazolone. | Do. |
| 17 | 4-methyl-2-(4'-aminophenylazo)-phenol. | Do. |
| 18 | 4-(N-ethyl-N-p-aminoethylamino)-4'-nitro-phenylazobenzene. | Red. |
| 19 | Copper complex of 2-amino-6-(2'-hydroxy-4'-sulphophenylazo)-5-naphthol-7-sulphonic acid. | Rubine. |
| 20 | 1:2-chromium complex of 1-amino-7-(2'-hydroxy-4'-nitrophenylazo)-8-naphthol-3:6-disulphonic acid. | Dull green. |
| 21 | 1:2-cobalt complex of 1-amino-7-(2'-hydroxy-4'-nitrophenylazo)-8-naphthol-3:6-disulphonic acid. | Purple. |
| 22 | Copper complex of 1-amino-7-(3'-chloro-2'-hydroxy-5'-sulphophenylazo)-8-naphthol-3:6-disulphonic acid. | Do. |
| 23 | 1:2-chromium complex of 2-amino-6-(2'-carboxyphenylazo)-5-naphthol-7-sulphonic acid. | Brown. |
| 24 | Copper complex of 2-amino-6-[2'-methoxy-5'-methyl-4'-(2'':5''-disulphophenylazo)-phenylazo]-5-naphthol-1:7-disulphonic acid. | Blue. |
| 25 | Copper complex of 4:4'-bis(1''-amino-8''-hydroxy-3'':6'-disulpho-7''-naphthylazo)-3:3'-dimethoxy diphenyl. | Do. |
| 26 | 1-(2':5'-dichloro-4'-sulphophenyl)-3-methyl-4-(3''-amino-6''-sulphophenylazo)-5-pyrazolone. | Yellow. |

*Example 27*

A solution of 19.2 parts of ethyl 3-(4':6'-dichloro-1':3':5'-triazin - 2' - yl)pentane-2:4-dione-3-carboxylate in 70 parts of acetone is added to a solution of 23.25 parts of the disodium salt of 2-(2'-methyl-4'-aminophenylazo)naphthalene-4:2-disulphonic acid in 320 parts of water, and the mixture is then stirred for 1 hour at 20°, the pH of the mixture being maintained between 6.5 and 7.0 by the addition of sodium carbonate. 32.0 parts of sodium chloride are then added and the precipitate is filtered off and dried. On analysis the product obtained is found to contain 1.0 atom of organically bound chlorine per azo group.

When applied to cellulose textile materials in conjunction with a treatment with an acid-binding agent the dyestuff yelds yellow shades possessing excellent fastness to wet treatments.

The ethyl 3-(4':6'-dichloro-1':3':5'-triazin-2'-yl)pentane-2:4-dione-3-carboxylate used in the above example may be obtained as follows:

A mixture of 11.6 parts of sodio ethyl diacetylacetate, 80 parts of anhydrous ether and 9.175 parts of cyanuric chloride is stirred and refluxed for 9 hours. The mixture is filtered and the resulting filtrate is distilled to remove the ether, leaving a residual oil of ethyl 3-(4':6'-dichloro-1':3':5'-triazin-2'-yl)-pentane-2:4-dione-3-carboxylate.

*Example 28*

A solution of 13.7 parts of 1-carboethoxy-1-(4':6'-dichloro-1':3':5'-triazin - 2' - yl)-propan-2-one in 70 parts of acetone is added to a stirred solution of 23.25 parts of the disodium salt of 2-(2'-methyl - 4' - aminophenylazo)naphthalene-4:8-disulphonic acid in 320 parts of water, and the resulting mixture is stirred for 5 hours at 20° and then 1 hour at 40°, the pH of the mixture being maintained between 6.0 and 6.5 by the addition of sodium carbonate. 64 parts of sodium chloride are added and the precipitate is filtered off and dried.

The product consists essentially of

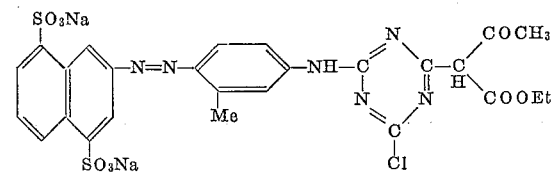

When applied to cellulose textile materials in conjunction with a treatment with an acid-bindng agent the dyestuff yields yellow shades possessing excellent fastness to wet treatments.

The 1 - carboethoxy-1-(4':6'-dichloro-1':3':5'-triazin-2'-yl)-propan-2-one used in the above example may be obtained as follows:

A mixture of 8.3 parts of sodio ethyl acetoacetate and 200 parts of anhydrous dioxan is added, during 10 minutes, to a stirred solution of 9.175 parts of cyanuric chloride in 100 parts dioxan. The mixture is then stirred for 3 hours at a temperature of 100° C. and the mixture is cooled to 20° C. and stirred for a further 8 hours. The mixture is filtered and the resulting filtrate is distilled to remove the dioxan, leaving a residual oil of 1-carboethoxy-1-(4':6'-dichloro-1':3':5'-triazin - 2' - yl)-propan-2-one.

*Example 29*

A solution of 16.7 parts of diethyl 1-(4':6':-dichloro-1':3':5' - triazin - 2' - yl)propane - 1:1-dicarboxylate in 70 parts of acetone is added to a solution of 23.25 parts of the disodium salt of 2-(2'-methyl - 4' - aminophenylazo)naphthalene-4:8-disulphonic acid in 320 parts of water, and the resulting mixture is then stirred for 12 hours at 20° C., the pH of the mixture being maintained between 6.0 and 6.5 by the addition of sodium carbonate. 32.0 parts of sodium chloride are then added and the precipitate is filtered off and dried. On analysis the product is found to contain 1.1 atoms of organically bound chlorine per azo group and consists essentially of the dyestuff of the formula:

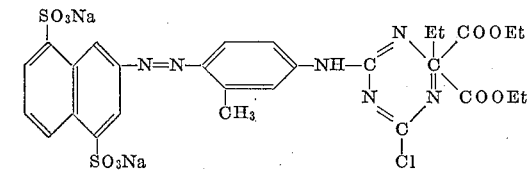

When applied to cellulose textile materials in conjunction with a treatment with an acid-binding agent the dyestuff yelds yellow shades possessing excellent fastness to wet treatments.

The diethyl 1-(4':6' - dichloro - 1':3':5'-triazin-2'-yl) propane-1:1-dicarboxylate used in the above example may be obtained as follows:

A mixture of 10.5 parts of sodio diethyl ethylmalonate and 30 parts of anhydrous dioxan is added, during 10 minutes, to a stirred solution of 9.175 parts of cyanuric chloride in 20 parts of anhydrous dioxan. The mixture is then stirred for 12 hours at a temperature of 100° C.

The mixture is cooled and filtered and the resulting filtrate is distilled to remove the dioxan leaving a residual oil of diethyl 1-(4':6'-dichloro-1':3':5'-triazin-2'-yl)propane-1:1-dicarboxylate.

Example 30

A solution of 17.95 parts of 1-phenylcarbamyl-1-(4':6'-dichloro-1':3':5'-triazin-2'-yl)-propan-2-one in 100 parts of acetone is added, during 30 minutes, to a solution of 23.25 parts of the disodium salt of 2-(2'-methyl-4'-aminophenylazo)-naphthalene-4:8-disulphonic acid in 320 parts of water, and the resulting mixture is then stirred for 12 hours at 20° C. and at 40° C. for 4 hours, the pH of the mixture being maintained between 6.0 and 6.5 by the addition of sodium carbonate. 64.0 parts of sodium chloride are then added and the precipitate is filtered off and dried. On analysis the product is found to contain 0.9 atom of organically bound chlorine per azo group. It consists essentially of the dyestuff of the formula:

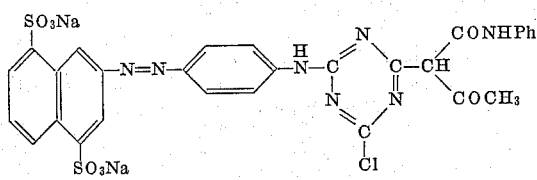

When applied to cellulose textile materials in conjunction with a treatment with an acid-binding agent the dyestuff yields yellow shades possessing excellent fastness to wet treatments.

The 1-phenylcarbamyl-1-(4':6'-dichloro-1':3':5'-triazin-2'-yl)-propan-2-one used in the above example may be obtained as follows:

A slurry of 8.8 parts of acetoacetanilide in 150 parts of water is mixed with 5 parts of 10 N sodium hydroxide solution in 50 parts of water.

A mixture of 9.2 parts of cyanuric chloride in 40 parts of acetone is added during 30 minutes. The mixture is stirred at 20° C. for 30 minutes during which time a precipitate is formed. The precipitate is filtered off, washed with water, and dried. The residual solid crystallises from a light petroleum ether (which boils between 60° and 80°) in the form of colourless needles which melt at 132° C. On analysis the product is found to contain 48.3% of carbon, 3.0% of hydrogen, 17.0% of nitrogen and 21.8% of chlorine. $C_{13}H_{10}N_4O_2Cl_2$ requires 48.0% of carbon, 3.1% of hydrogen, 17.25% of nitrogen and 21.85% of chlorine.

Example 31

A solution of 5.6 parts of aniline in 30 parts of acetone is added, during 20 minutes, to a solution of 33.8 parts of the condensation product of Example 5 in 300 parts of water, and the resulting mixture is then stirred for 4 hours at 40° C., the pH of the mixture being maintained between 6.5 and 7.0 by the addition of sodium carbonate. 30 parts of sodium chloride are then added and the precipitated dyestuff is filtered off and dried. On analysis the product is found to be free from organically bound chlorine. It consists essentially of the dyestuff of the formula:

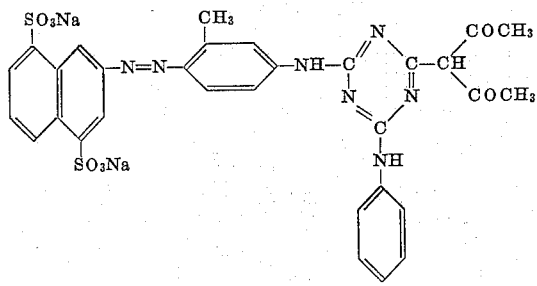

When applied to cellulose textile materials in conjunction with a treatment with an acid-binding agent the dyestuff yields yellow shades possessing excellent fastness to wet treatments.

Example 32

A mixture of 9.4 parts of 1:3-phenylenediamine-4-sulphonic acid, 5.3 parts of sodium carbonate and 175 parts of water is added to a mixture of 18.4 parts of 3-(2'(4'):6'-dichloropyrimidin-4'(2')-yl)pentane-2:4-dione, 45 parts of dioxan and 45 parts of water and the resulting mixture is stirred and heated at a temperature of 80° C. for 7 days. The solution is cooled to below 5° C. and 25.3 parts of 2 N sodium nitrite solution are added, followed by 9.3 parts of 10 N hydrochloric acid. The resulting mixture is then added to a mixture of 24.45 parts of 8-benzoylamino-1-naphthol-3:6-disulphonic acid, 25 parts of sodium carbonate and 320 parts of water during 20 minutes and the resulting mixture is stirred for 2 hours at a temperature below 5° C., the pH of the mixture being maintained between 7.0 and 8.5 by the addition of sodium carbonate. 90 parts of sodium chloride are then added and the precipitate is filtered off and dried.

When applied to cellulose textile materials in conjunction with a treatment with an acid-binding agent the dyestuff so obtained yields red shades possessing excellent fastness to wet treatments.

The 3-(2'(4'):6'-dichloropyrimidin-4'(2')-yl)pentane-2:4-dione used in the above example may be obtained as follows:

A mixture of 6.7 parts of sodio acetylacetone, 100 parts of anhydrous dioxan and 9.1 parts of 2:4:6-trichloropyrimidine is stirred and refluxed for 10 hours. The mixture is filtered and the resulting filtrate is distilled to remove the dioxan, leaving a residual oil which solidifies on leaving overnight. The residual crystallises from a light petroleum (which boils between 100° and 120° C.) in the form of colourless needles which melt between 146° C. and 148° C. On analysis the product is found to contain 44.2% of carbon, 3.7% of hydrogen, 11.5% of nitrogen and 28.7% of chlorine. $C_9H_8N_2O_2Cl_2$ requires 43.75% of carbon, 3.25% of hydrogen, 11.35% of nitrogen and 28.75% of chlorine.

Example 33

A solution of 15.88 parts of the trisodium salt of 1-amino-4-(4'-aminoanilino)anthraquinone-2:3':5-trisulphonic acid in 250 parts of water is added, during 10 minutes, to a stirred suspension of 6.83 parts of 3-(4':6'-dichloro-1':3':5'-triazin-2'-yl)pentane dione in a mixture of 35 parts of dioxan and 75 parts of water. The resulting mixture is stirred at 20–25° C. for 30 minutes, then for 1 hour at 30–35° C. and finally at 40–42° C. for 75 minutes. The pH of the reaction mixture is maintained at 6–6.5 throughout the reaction by the gradual addition of 2 N sodium carbonate solution. The mixture is cooled to 20° C., 80 parts of sodium chloride are added and the mixture is stirred for 15 minutes at room temperature. The precipitate is filtered, washed on the filter with a 20% aqueous solution of sodium chloride and dried in vacuo. When applied to cellulose textile materials in conjunction with a treatment with an acid-binding agent the dyestuff yields greenish blue shades possessing excellent fastness to wet treatments. By substituting in the above Example 13 67 parts of the disodium salt of 1-amino-4-(4'-methylaminoanilino)anthraquinone-2:3'-disulphonic acid in place of the 15.88 parts of the trisodium salt of 1-amino-4-(4'-amino-anilino)anthraquinone-2:3':5-trisulphonic acid a reddish blue dyestuff of similar properties is obtained.

Example 34

A solution of 13.33 parts of the disodium salt of 1-amino-4-(3'-aminoanilino)anthraquinone-2:4'-disulphonic acid in 250 parts of water is added, during 15 minutes, to a stirred suspension of 12.8 parts of diethyl-α-(4:6-dichloro-1:3:5-triazin-2-yl)malonate in 110 parts of dioxon and 75 parts of water. The resulting mixture is stirred for 30 minutes at 10–15° C., then for 1 hour at 25–30° C. The pH of the reaction mixture is maintained at 6–6.5 throughout the reaction by the gradual addition of 2 N sodium carbonate solution. The reaction mixture is filtered to remove a trace of insoluble material. The filtrates are stirred at room temperature, 110 parts of sodium chloride are added and the mixture is stirred for 30 minutes. The precipitated dyestuff is filtered, washed on the filter with a 25% aqueous solution of sodium chloride and dried in vacuo.

When applied to cellulose textile materials in conjunction with a treatment with an acid-binding agent the dyestuff yields reddish blue shades possessing excellent fastness to wet treatments.

*Example 35*

A solution of 10 parts of the trisodium salt of 1-amino-4-(4'-aminoanilino)anthraquinone-2:3':5-trisulphonic acid in 150 parts of water is added to a stirred suspension of 12.0 parts of 2-chloro-4:6-di[bis(carboethoxy)methyl]-1:3:5-triazine in 80 parts of dioxan and 100 parts of water. The resulting mixture is stirred at 60° C. for 2 hours. The pH of the reaction mixture is maintained at 6–6.5 throughout the reaction by the gradual addition of 2 N sodium carbonate. The reaction mixture is filtered to remove a trace of insoluble material. The filtrates are stirred at room temperature, 60 parts of sodium chloride are added and the mixture is stirred for 15 minutes. The precipitated dyestuff is filtered, washed on the filter with a 20% aqueous solution of sodium chloride and is dried in vacuo.

When applied to cellulose textile materials in conjunction with a treatment with an acid-binding agent the dyestuff yields greenish blue shades possessing excellent fastness to wet treatments.

*Example 36*

13.3 parts of the disodium salt of 2-nitro-4'-aminodiphenylamine-3':4-disulphonic acid are dissolved with stirring in 300 parts of water. Then a solution of 7.4 parts of 3-(4':6'-dichloro-1':3':5'-triazin-2'-yl)pentane-2:4-dione in 30 parts of acetone is added. The temperature of the mixture is kept between 30° and 35° C. and the pH is kept between 6.0 and 6.5 by the addition of sodium carbonate. When the reaction is finished, the dyestuff is precipitated by the addition of potassium chloride, filtered off and dried.

It dyes cellulose in greenish yellow shades fast to washing and to light.

*Example 37*

12.0 parts of a mixture of copper phthalocyanine-3-sulphon-N-(4'-aminophenyl)amide - 3 - sulphonamide-3-sulphonic acids (obtained as described below) are dissolved in 800 parts of water by stirring and adding sodium carbonate until the pH of the solution is 7.0. Then a solution of 3.0 parts of 3-(4':6'-dichloro-1':3':5'-triazin-2'-yl)pentane-2:4-dione in 100 parts of acetone is added. The temperature of the mixture is kept between 30° and 35° C. and the pH is kept between 6.0 and 6.5 by the addition of sodium carbonate. When the reaction is finished, 100 parts of sodium chloride are added and the precipitated dyestuff is filtered off and dried.

It dyes cellulose fabrics in greenish-blue shades fast to washing and to light.

The mixture of copper phthalocyanine-3-sulphon-N-(4'-aminophenyl)amide-sulphonamide sulphonic acids used in the above example contains 1 sulphon-N-(4'-aminophenyl)amide group, about 1.5 sulphonamide groups and about 1.5 sulphonic acid groups for each atom of copper and may be obtained as follows:

115.2 parts of copper phthalocyanine are slowly added with stirring to 540 parts of chlorosulphonic acid and the mixture is then stirred for 3 hours at a temperature between 140° and 145° C. The mixture is cooled to 80° C., 100 parts of thionyl chloride are added and the mixture is then stirred for 2 hours at a temperature of 85° C. The mixture is cooled to 20° C., poured onto ice and the precipitated phthalocyanine sulphonchloride is filtered off and washed with 1000 parts of a 1% aqueous solution of hydrochloric acid which has been cooled to 0° C.

The solid sulphonchloride so obtained is stirred with 1000 parts of water and 600 parts of ice and 30 parts of p-aminoacetanilide are then added. The pH of the resultant mixture is adjusted to 8 by the addition of a 2 N aqueous solution of ammonium hydroxide and the temperature of the mixture is then raised to 50° C. during 1 hour, the pH of the mixture being maintained at 8 by further additions of a 2 N aqueous solution of ammonium hydroxide. The mixture is then stirred at a temperature of 50° C. until no further additions of ammonium hydroxide solution are required to maintain the pH at 8. 500 parts of a concentrated aqueous solution of hydrochloric acid are then added and the mixture is stirred for 4 hours at a temperature of 90° C. The mixture is then cooled to 20° C. and the precipitated solid is filtered off, washed with a 1% aqueous solution of hydrochloric acid and dried.

If, instead of 3.0 parts of 3-(4':6'-dichloro-1':3':5'-triazin-2'-yl)pentane-2:4-dione used in the above example, there are used 3.8 parts of diethyl-α-(4:6-dichloro-1:3:5-triazin-2-yl)malonate or 3.2 parts of ethyl-α-(4:6-dichloro-1:3:5-triazin-2-yl)-α-cyanoacetate, similar products are obtained.

*Example 38*

15 parts of a mixture of copper phthalocyanine 3-sulphon-N-(4'-amino-3'-sulphophenyl)amide - 3 - sulphonamide-3-sulphonic acid (obtained as described below) are dissolved in 500 parts of water by stirring and adding sodium carbonate until the pH of the solution is 7.0. Then a solution of 3.5 parts of 3-(4':6'-dichloro-1':3':5'-triazin-2'-yl)pentane-2:4-dione in 50 parts of acetone is added. The temperature of the mixture is kept between 30° and 35° C. and the pH is kept between 6.0 and 6.5 by the addition of sodium carbonate. When the reaction is finished 150 parts of sodium chloride are added and the precipitated dyestuff is filtered off and dried.

It dyes cellulose fabrics in greenish blue shades fast to washing and to light.

A similar product is obtained if there are used 4.4 parts of diethyl α-(4:6-dichloro-1:3:5-triazin-2-yl)malonate instead of the 3.5 parts of 3-(4':6'-dichloro-1':3':5'-triazin-2'-yl)pentane-2:4-dione.

The phthalocyanine starting material may be obtained as follows:

A suspension of chlorosulphonated copper phthalocyanine (obtained as described in Example 37), and 37.6 parts of 1:4-phenylenediamine-3-sulphonic acid in 1000 parts of water and 600 parts of ice is adjusted to 8 by the addition of a 2 N aqueous solution of ammonium hydroxide and the temperature of the mixture is then raised to 50° C. during 1 hour, the pH of the mixture being maintained at 8 by further additions of a 2 N aqueous solution of ammonium hydroxide. The mixture is then stirred at a temperature of 50° C. until no further additions of ammonium hydroxide solution are required to maintain the pH at 8.

Sufficient aqueous hydrochloric acid is added to make the mixture acid to Congo red and the precipitate is filtered off, washed with dilute hydrochloric acid and dried.

*Example 39*

12.0 parts of a mixture of copper phthalocyanine 3-sulphon - N - (3'-aminophenyl)amide-3-sulphonamide-3-sulphonic acids (obtained as described below) are dissolved in 800 parts of water by stirring and adding sodium carbonate until the pH of the solution is 7.0. Then a solution of 3.0 parts of 3-(4':6'-dichloro-1':3':5'-triazin-2'-yl)pentane-2:4-dione in 100 parts of acetone is added. The temperature of the mixture is kept between 30° and 35° C. and the pH is kept between 6.0 and 6.5 by the addition of sodium carbonate. When the reaction is finished, 100 parts of sodium chloride are added and the precipitated dyestuff is filtered off and dried.

It dyes cellulose fabrics in greenish blue shades fast to washing and to light.

If in place of the 3.0 parts of 3-(4':6'-dichloro-1':3':5'-triazin-2'-yl)pentane-2:4-dione there are used 3.8 parts of diethyl-α-(4:6-dichloro-1:3:5-triazin-2-yl)malonate, a similar product is obtained.

The mixture of copper phthalocyanine 3-sulphon-N-(3'-aminophenyl)amide-3-sulphonamide - 3 - sulphonic acids used in the above example may be obtained by the procedure described in Example 37, using m-aminoacetanilide in place of p-aminoacetanilide.

*Example 40*

12.0 parts of a mixture of copper phthalocyanine 3:4':4'':4'''-sulphon-N-(meta-aminophenyl)amide - sulphonamide sulphonic acids (obtained as described below) are dissolved in 800 parts of water by stirring and adding sodium carbonate until the pH of the solution is 7.0. Then a solution of 3.0 parts of 3-(4':6'-dichloro-1':3':5'-triazin-2'-yl)pentane-2:4-dione in 100 parts of acetone is added. The temperature of the mixture is kept between 30° and 35° C. and the pH is kept between 6.0 and 6.5 by the addition of sodium carbonate. When the reaction is finished, 100 parts of sodium chloride are added, and the precipitated dyestuff is filtered off and dried.

It dyes cellulose fabrics in greenish-blue shades fast to washing and to light.

If in place of the 3.0 parts of 3-(4':6'-dichloro-1':3':5'-triazin-2'-yl)pentane-2:4-dione used in the above example there are used 3.8 parts of diethyl-α-(4:6-dichloro-1:3:5-triazin-2-yl)malonate, a similar product is obtained.

The copper phthalocyanine 3:4':4'':4'''-sulphon-N-(3'-aminophenyl)amide sulphonamide sulphonic acid used in the above example may be obtained as follows:

186 parts of the potassium salt of copper phthalocyanine tri-4-sulphonic acid are slowly added to 736 parts of chlorosulphonic acid and the resulting mixture is stirred for 3 hours at 135° to 140° C. The mixture is then cooled to 80°, 100 parts of thionyl chloride are added and the mixture is stirred for 2 hours at 85° C. The mixture is then cooled to 10° C., poured onto ice and the precipitated copper phthalocyanine 3:4':4'':4'''-tetrasulphonchloride is filtered off and washed with 1000 parts of a 1% aqueous solution of hydrochloric acid.

The solid sulphonchloride so obtained is stirred with 1000 parts of water and 600 parts of ice and 30 parts of m-aminoacetanilide are then added. The pH of the resultant mixture is adjusted to 8 by the addition of a 2 N aqueous solution of ammonium hydroxide and the temperature of the mixture is then raised to 50° C. during 1 hour, the pH of the mixture being maintained at 8 by further additions of a 2 N aqueous solution of ammonium hydroxide. The mixture is then stirred at a temperature of 50° C. until no further additions of ammonium hydroxide solution are required to maintain the pH at 8. 500 parts of a concentrated aqueous solution of hydrochloric acid are then added and the mixture is stirred for 4 hours at a temperature of 90° C. The mixture is then cooled to 20° C. and the precipitated solid is filtered off, washed with a 1% aqueous solution of hydrochloric acid and dried.

What we claim is:
Dyestuffs of the formula:

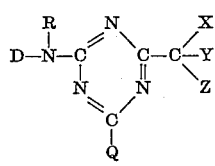

wherein D is a chromophoric radical selected from the class consisting of azo, anthraquinone, and phthalocyanine chromophoric radicals, Q is a substituent selected from the class consisting of chlorine and

wherein R represents a member selected from the class consisting of hydrogen and lower alkyl; X represents a member selected from the class consisting of hydrogen, lower alkyl, —COR', and —COOR'; Y is selected from the class consisting of —COR' and —COOR', and Z is selected from the class consisting of —CN, —COR', —COOR', and —CONHC$_6$H$_5$; and R' represents a lower alkyl radical.

References Cited by the Examiner
UNITED STATES PATENTS

| | | | |
|---|---|---|---|
| 2,929,809 | 3/60 | Menzi et al. | 260—146 |
| 2,964,520 | 12/60 | Baker et al. | 260—153 |
| 3,110,710 | 11/63 | Rattee et al. | 260—249 X |
| 3,113,127 | 12/63 | Anderson et al. | 260—153 X |
| 3,116,275 | 12/63 | Gamlen et al. | 260—153 X |

FOREIGN PATENTS

| | | |
|---|---|---|
| 206,081 | 11/59 | Austria. |
| 846,505 | 8/60 | Great Britain. |

OTHER REFERENCES

Belgian Report No. 54A (abstract of Belgian Patent 573,126), June 30, 1959.

Smolin et al.: "Heterocyclic Compounds," "S-Triazines and Derivatives," 1959, Interscience Publishers, Inc., New York, page 60.

CHARLES B. PARKER, *Primary Examiner.*